United States Patent
Hikmet et al.

(10) Patent No.: US 12,337,525 B2
(45) Date of Patent: Jun. 24, 2025

(54) POWER COATED FDM PRINTED ITEM, RELATED MANUFACTURING METHOD AND APPARATUS

(71) Applicant: SIGNIFY HOLDING B.V., Eindhoven (NL)

(72) Inventors: Rifat Ata Mustafa Hikmet, Eindhoven (NL); Wilhelmus Johannes Hendricus Ansems, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 503 days.

(21) Appl. No.: 16/349,773

(22) PCT Filed: Nov. 13, 2017

(86) PCT No.: PCT/EP2017/079036
§ 371 (c)(1),
(2) Date: May 14, 2019

(87) PCT Pub. No.: WO2018/095753
PCT Pub. Date: May 31, 2018

(65) Prior Publication Data
US 2019/0275733 A1    Sep. 12, 2019

(30) Foreign Application Priority Data
Nov. 22, 2016  (EP) .................................. 16199905

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/30* (2017.08);
(Continued)

(58) Field of Classification Search
CPC ..... B29C 61/118; B29C 64/209; B33Y 10/00; B33Y 30/00; B33Y 40/00; B33Y 80/00; B33Y 70/00
(Continued)

(56) References Cited

U.S. PATENT DOCUMENTS

| 5,234,636 A | 8/1993 | Hull et al. |
| 8,123,999 B2 | 2/2012 | Priedeman, Jr. et al. |

(Continued)

FOREIGN PATENT DOCUMENTS

| CN | 106132654 A | 11/2016 |
| WO | WO91/04798 | * 4/1991 |

(Continued)

*Primary Examiner* — Jacob T Minskey

(57) ABSTRACT

The invention provides a method for 3D printing a 3D item, the method comprising providing 3D printable material (201) and printing during a printing stage said 3D printable material (201), wherein the 3D printable material (201) comprises a thermoplastic material, to provide said 3D item, wherein the 3D item comprises an item surface, wherein the method further comprises providing a powder coating with a powder coating device (595) on at least part of said item surface during a coating stage. The invention also relates to the item manufactured by such method and to the manufacturing apparatus (500) used.

14 Claims, 5 Drawing Sheets

(51) Int. Cl.
  *B29C 64/30* (2017.01)
  *B29C 70/64* (2006.01)
  *B29C 70/88* (2006.01)
  *B33Y 10/00* (2015.01)
  *B33Y 30/00* (2015.01)
  *B33Y 70/00* (2020.01)
  *B33Y 80/00* (2015.01)
  *B29K 101/12* (2006.01)
  *B29L 11/00* (2006.01)

(52) U.S. Cl.
  CPC ............ *B29C 70/64* (2013.01); *B29C 70/882* (2013.01); *B33Y 10/00* (2014.12); *B33Y 30/00* (2014.12); *B33Y 70/00* (2014.12); *B33Y 80/00* (2014.12); *B29K 2101/12* (2013.01); *B29L 2011/00* (2013.01)

(58) Field of Classification Search
  USPC ......................................................... 264/494
  See application file for complete search history.

(56) References Cited

U.S. PATENT DOCUMENTS

| | | | |
|---|---|---|---|
| 10,254,499 B1* | 4/2019 | Cohen | B23K 1/19 |
| 2008/0128286 A1* | 6/2008 | Wu | B82Y 20/00 |
| | | | 205/95 |
| 2016/0114542 A1 | 4/2016 | Quere et al. | |

FOREIGN PATENT DOCUMENTS

| | | |
|---|---|---|
| WO | 2015108574 A1 | 7/2015 |
| WO | 20150109143 A1 | 7/2015 |
| WO | 2015152875 A1 | 10/2015 |
| WO | 2016083181 A1 | 6/2016 |
| WO | 2016124432 A1 | 8/2016 |

* cited by examiner

POWER COATED FDM PRINTED ITEM, RELATED MANUFACTURING METHOD AND APPARATUS

CROSS-REFERENCE TO PRIOR APPLICATIONS

This application is the U.S. National Phase application under 35 U.S.C. § 371 of International Application No. PCT/EP2017/079036, filed on Nov. 13, 2017 which claims the benefit of European Patent Application No. 16199905.7, filed on Nov. 22, 2016. These applications are hereby incorporated by reference herein.

FIELD OF THE INVENTION

The invention relates to a method for manufacturing a 3D item by means of fused deposition modeling. The invention also relates to the 3D (printed) item obtainable with said method. Further, the invention relates to an optical element including such 3D (printed) item. Yet further, the invention also relates to a 3D printer for printing such 3D item with such method.

BACKGROUND OF THE INVENTION

Smoothing methods for layered deposition modeling surfaces are known in the art. U.S. Pat. No. 8,123,999 B2, for instance, describes a method for making a three-dimensional object comprising the steps of: (i) providing an object built from a modeling material using a fused deposition modeling technique, wherein the modeling material comprises a thermoplastic resin, wherein the built object has an object surface formed of the modeling material, the object surface having at least one surface effect due to the fused deposition modeling technique that extends substantially across an entirety of the object surface, wherein the at least one surface effect comprises a stair step effect, striation, or a combination thereof, and wherein the object exhibits porosity due to the fused deposition modeling technique; placing the object in a vessel; (ii) exposing substantially the entire object surface to vapors of a solvent that transiently softens the modeling material at the object surface while the object resides in the vessel in a solvent vapor zone present below cooling elements in the vessel; (iii) reflowing the softened modeling material to reduce the at least one surface effect and to reduce the porosity of the object at the object surface; (iv) observing condensation of the solvent vapors on the object surface while reflowing the softened modeling material; (v) discontinuing the exposure of the object surface to the solvent vapors after the condensation of the solvent vapors stops; and (vi) drying the object after discontinuing the exposure, wherein the object surface of the dried object is substantially free of the at least one surface effect and is substantially free of the porosity.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

However, in variants the printable material is provided as filament to the printer, especially the printer head. However, in yet other embodiments the printable material may be provided as granules, with the printer, especially the printer head, providing a filament. In embodiments, the granules are converted into a filament in the printer head.

FDM printers are relatively fast, low cost and can be used for printing complicated 3D objects. Such printers are used in printing various shapes using various polymers. The technique is also being further developed in the production of LED luminaires and lighting solutions.

One of the problems of FDM is the ribbed structure as a result of layer to layer deposition of filaments. The ribbed structure is in the art also indicated as "stair step" or "striation". Herein, this (ribbed) structure is also indicated as "fused deposition modeling related step structure". The solution in the prior art indicated above may lead to a removal of possible desirable substructures (like curvatures or facets) and/or the undesired abundant use of chemicals, including solvents.

Of course, an alternative technology may be applied, such as stereo lithography. Stereo lithography tends to produce much smoother surfaces which can have roughnesses less than few microns. As the product comes out of production the surface of the part still is covered by monomer which needs to be cured by flood illumination which makes the surface quite smooth. However, even then some remaining roughness may be removed, if desirable, as indicated in U.S. Pat. No. 5,234,636 B1. Such technical solution, however, is a complex and relatively expensive solution which does not allow the use of a more desirable technology such as FDM.

In the case of FDM the surface roughness of the printed surfaces may vary from tens of micron to fraction of a millimeter, or even larger. One can use thick coatings from a solvent comprising e.g. pure cross-linkable monomer. If the coating is thin then it only covers the surface of the ribs and follows their profile, which does essentially not lead to a reduction of the surface profile. However, when a thick coating is applied it can indeed cover the surfaces to make the ribbed structure much less visible and planar, but then possible desirable substructures may also be covered with the coating, which may not be desirable.

Hence, it is an aspect of the invention to provide an alternative additive manufacturing technology, which preferably further at least partly obviates one or more of above-described drawbacks. It is also an aspect of the invention to provide an alternative 3D printed item (herein also indicated as "3D item"), which preferably further at least partly obviates one or more of above-described drawbacks. Yet further, it is an aspect of the invention to provide an alternative 3D printer, which preferably further at least partly obviates one or more of above-described drawbacks. Also, it is an aspect of the invention to provide an alternative optical element, which preferably further at least partly obviates one or more of above-described drawbacks.

Therefore, in a first aspect the invention provides a method for 3D printing a 3D item (or "3D printed item") by means of fused deposition modeling using a 3D printable material that comprises a thermoplastic material. The method comprises a printing stage during which the 3D printable material is printed using a fused deposition modeling printer to provide said 3D item. The 3D item comprises an item surface, and the method further comprises a coating stage during which a powder coating (herein also indicated as "coating") is provided with a powder coating process on at least part of said item surface.

With such method it is amongst others possible to provide a 3D printed object with a reduced step profile, such as known from FDM 3D printing whereas a larger profile ("substructure") does not essentially disappear. Hence, relatively smooth surfaces may be provided with conservation of the macro structure or substructure. It further appeared that other coating methods may not provide the desired result. At least dip coating with different types of thermosetting liquids, having a high or low viscosity, did not lead to the desired results, and lead e.g. to a loss of substructure. Hence, with the presently proposed method the advantages of FDM can be used while a possible disadvantage the step structure may be diminished or even essentially eliminated.

Hence, the invention provides a method for 3D printing a 3D item which method at least includes a printing stage, wherein 3D printable material is printed, to provide 3D printed materials, thereby providing the 3D printed item. This stage may include FDM printing as known in the art, though in specific embodiments, especially an electrically conductive printable material may be provided (see also below).

As indicated above, the invention thus provides a method comprising providing a filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) material (i.e. polymer) selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general these (polymeric) materials have a glass transition temperature $T_g$ and/or a melting temperature $T_m$. The 3D printable material may be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the method comprises heating the 3D printable material above the glass transition and if it is a semi-crystalline polymer above the melting temperature. In yet another embodiment, the 3D printable material comprises a (thermoplastic) polymer having a melting point ($T_m$), and the method comprises heating the 3D printable material to be deposited on the receiver item to a temperature of at least the melting point.

The glass transition temperature is in general not the same as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

Specific examples of materials that can be used can e.g. be selected from the group consisting of acrylonitrile butadiene styrene (ABS), polylactic acid (PLA), polycarbonate (PC), polyamide (PA), polystyrene (PS), PET, thermoelastic elastomer, etc.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby. See further also below were specific (separate) substrates are discussed.

The substrate used may e.g. provide a metallic surface or a glass surface, especially a surface that includes substantially flat parts. The substrate may be the printing platform, or an item on the printing platform (see also above). In embodiments, the substrate may include a coating for facilitating removal of the said 3D item comprising said layer and/or for increasing the flatness of the substrate.

For the FDM printing stage a single printer head FDM printer or a multiple printer head FDM printer may be applied. Especially, when e.g. electrically conductive and electrically non-conductive printable material is applied, a FDM printer with multiple printer heads may be used, though also one after the other printable materials may be printed (with a single printer head).

After providing the 3D item, or at least part thereof, the coating stage may be started. The 3D printed item has a surface on which the powder coating may be applied. Hence, the method further comprises providing a powder coating (herein also indicated as "coating") with a powder coating process on at least part of said item surface during a coating stage. Hence, the coating stage may subside the printing stage. However, in other embodiments two or more printing stages and may alternate one or more coating stages.

According to the Powder Coating Institute (www.powdercoating.org), powder coating is a dry finishing process. Powder coatings are based on polymer resin systems, combined with curatives, pigments, leveling agents, flow modifiers, and other additives. These ingredients are melt mixed, cooled, and ground into a uniform powder similar to baking flour. A process called electrostatic spray deposition (ESD) is typically used to achieve the application of the powder coating to a metal substrate. This application method uses a spray gun, which applies an electrostatic charge to the powder particles, which are then attracted to the grounded part. After application of the powder coating, the parts enter a curing oven where, with the addition of heat, the coating chemically reacts to produce long molecular chains, resulting in high cross-link density. These molecular chains are very resistant to breakdown. This type of application is the most common method of applying powders. Powder coatings can also be applied to non-metallic substrates such as plastics and medium density fiberboard (MDF). In specific embodiments, a spray gun, especially a corona gun, may be applied to provide the powder coating. Hence, in embodiments the coating stage comprises an electrostatic spray deposition process.

In general, according to e.g. www.akzonobel.com there are six main ingredients that make up the recipe for powder coatings:
Resin is always present and comes in two types; polyester and epoxy;
Curing agents are added to bind the coating. For polyesters, primid curing agents are used. For epoxies, dicyandiamide curing agents are used. Hybrid curing agents are also occasionally used, which contain different quantities of the primid and dicyandiamide curing agents;
There are various additives that are often used with a wide range of properties. Some of these give the powder a matt effect and others create a hardened finish, for example;
Post additives prevent the powder from caking and are added when the powder is hard and broken into small chips;
Tint pigments are also added to the mix. There are two types; inorganic, which are generally pale and dull and organic, which are more brightly colored;
Extenders (fillers) are added to reduce glossiness and supply the coating with extra durability.

The quantity of each ingredient differs depending on a number of factors. The powder may be thermoplastic (becomes soft, remoldable and weldable when heat is added) or thermoset polymer (cannot be welded or remolded when heated). In the present invention, the presence of a tint pigment (or "pigment") is not obligatory, but it can be desirable.

Especially good results may be obtained when the powder coating is based on a thermosetting polymer (and not a thermoplastic polymer). Using a thermosetting polymer may allow lower processing temperatures, including e.g. radiative curing, such as UV curing. Hence, in embodiments the powder coating process comprises providing a coating material to said item surface, wherein said coating material comprises a thermosetting polymer. Yet further, in embodiments the coating material comprises radiation curable material, and the coating stage comprises providing said coating material to said surface and curing said coating material by providing curing radiation. For instance, UV radiation or blue radiation, especially at least UV radiation, may be applied to cure the thermosetting polymer. Hence, in embodiments the method may also include UV curing a UV curable powder coating.

Alternatively, or additionally, the coating material may comprise a thermally curable material, especially having a curing temperature lower than one or more of a melting temperature and a glass temperature of said thermoplastic material, especially below both the melting temperature and the glass temperature of said thermoplastic material. For instance, the difference in temperature is at least 10° C., especially at least 20° C.

For powder coating, the surface to be coated may especially be electrically conductive. This can be obtained by coating, such as dip coating or spraying, the item surface of the 3D printed object (including at least part thereof) with an electrically conductive liquid, though other methods known in the art may also be applied.

Especially, however, during the printing process it may already be chosen to make at least the item surface material electrically conductive. This may imply (i) using printable material that is electrically conductive for all printable/printed parts, or (ii) only using such electrically conductive material for those parts that provide the item surface, and using electrically non-conductive (i.e. isolating) printable material for the other printable parts.

The entire surface of the 3D printed item may be electrically conductive, or at least part thereof. Of course, especially the part that is to be provided with the powder coating is (made) electrically conductive (either by the temporary coating and/or by using electrically conductive printable material). Hence, a phrase like "coating the surface of the 3D printed object" and similar phrases may especially indicated that at least part of the 3D printed object may be coated with the powder coating.

Herein, a conductive material may especially comprise a conductivity (at room temperature) of at least $1 \cdot 10^5$ S/m, such as at least $1 \cdot 10^6$ S/m. Herein a conductivity of an insulating material may especially be equal to or smaller than $1 \cdot 10^{-10}$ S/m, especially equal to or smaller than $1 \cdot 10^{-13}$ S/m. Herein a ratio of an electrical conductivity of an isolating material (insulator) and an electrical conductivity of a conductive material (conductor) may especially be selected smaller than $1 \cdot 10^{-15}$.

The introduction of additives to induce surface resistivity less than $10^9$ ohm/square may be desirable, especially when the 3D printed material as such is used to coat the powder coating in. Hence, in embodiments at least part of the surface of the 3D printed material has a surface resistivity less than $10^9$ ohm/square. Hence, in embodiments the printable material comprises an additive for providing a surface resistivity of equal to or less than $10^9$ ohm/square. Especially, the printable material comprises an additive for providing a surface resistivity of equal to or less than $10^9$ ohm/square for the 3D printed material obtained by printing the 3D printable material having this additive. Another term for surface resistivity is "sheet resistivity". Further, the term "additive" may also refer to a plurality of different additives. Therefore, in embodiments at least part of the printed material, providing at least part of the surface of the 3D printed item, has a surface resistivity of equal to or less than $10^9$ ohm/square (provided by an additive embedded in the 3D printed material).

Therefore, in embodiments said 3D printable material has electrically conductive properties, and the printing stage comprises printing said 3D printable material such that it provides at least part of said item surface of the 3D item.

For making the printable material conductive, especially carbon particles, such as graphite comprising particles or graphene comprising particles, etc. may be applied. It is also possible to obtain conductivity using metal particles such as silver particles or silver coated copper particles, etc. It is also possible to use metal wires, such as steel and nickel to obtain conductivity. Electrically conductive material, such as particles and (micro) wires may be embedded in the 3D printable material.

Hence, in embodiments the printable material comprises carbon particles, such as graphite particles, having a weight averaged particle size selected from the range of 10 nm to 100 μm. The concentration of the carbon particles may be especially in the range of about 3 to 20% wt. % in the polymer.

Hence, in embodiments (of the method) a first 3D printable material has electrically conductive properties and a second 3D printable material has electrically isolating properties, and the printing stage comprises printing said first 3D printable material such that it provides at least part of said item surface of the 3D item, and printing said second 3D printable material for those part(s) of the 3D item that are not based on said first 3D printable material. In the printing stage, the different printable materials may be printed one after the other (such as when the printer includes a single printer head), or in an alternating printing process the different materials are printed (such as when the printer includes a multiple printer head).

As indicated above, instead of using electrically conductive printable material, or in addition thereto, an electrically conductive (temporary) layer may be provided, such as e.g. an electrically conductive paint. Methods for preparing a surface for electrostatic powder coatings are known in the art. Hence, in embodiments the coating stage also includes providing an electrically conductive layer to said item surface before providing said powder coating. This part of the (coating) stage precedes the (electrostatically) coating of the powder coating to the 3D printed item.

As indicated above, the present method may especially be useful for 3D printed items made via FDM which have a non-planer surface, such as having one or more facets, such as a facetted surface, and/or having one or more curved parts in the surface, such as convex parts and/or concave parts, whereon superimposed the step structure of the (former) filaments is available. Hence, there is a larger substructure, with height differences essentially larger than the height differences provided by the steps between two (former) filaments.

Would in embodiments the surface have one or more curvatures, or would in embodiments the surface be curved, the radius of such curvature is substantially larger than a radius of the FDM related step structures ("ribs"). For instance, the radius can be at least 5 times larger, such as at least 10 times larger. Would the surface comprise one or more facets, each facet may have a height and/or a length and/or a width, substantially larger than a radius of the FDM related step structures ("ribs"). For instance, the height and/or a length and/or a width can be at least 5 times larger, such as at least 10 times larger than the radius Hence, in embodiments the printing stage comprises providing said 3D item with said item surface comprising a non-planar substructure (such as e.g. selected from the group of a curved structure and a facet), especially having a maximum substructure height ($t_{sub}$), with superimposed on the non-planar substructure a fused deposition modeling related step structure, especially having top-bottom height differences ($t_{rib}$) between tops and bottoms, even more especially selected from the range of $t_{sub}$=10 μm to 10 mm. Especially, the coating stage comprises providing said powder coating on said non-planar substructure with a coating thickness variation relative to the bottoms being smaller than the maximum substructure height ($t_{sub}$). In this way the substructure remain visible.

In specific embodiments wherein the printing stage comprises providing said 3D item (10) with said item surface (11) comprising a non-planar substructure (430) with superimposed on the non-planar substructure (430) a fused deposition modeling related step structure (435) having tops (436) and bottoms (437), the tops (436) having rib heights ($t_{rib}$) relative to the bottoms (437).

Further, in embodiments the coating stage comprises providing said powder coating (405) on said non-planar substructure (430) with a maximum coating thickness ($t_{high}$) relative to a lowest bottom (437) of the non-planar substructure (430), with a ratio of the maximum coating thickness ($t_{high}$) to the rib heights ($t_{rib}$) selected from the range of $1 < t_{high}/t_{rib} \leq 5$, such as especially $1 < t_{high}/t_{rib} \leq 2$, even more especially $1 < t_{high}/t_{rib} \leq 1.2$.

In embodiments, the printing stage comprises providing said 3D item (10) with said item surface (11) comprising a non-planar substructure (430), having a maximum substructure height ($t_{sub}$), with superimposed on the non-planar substructure (430) a fused deposition modeling related step structure (435) having tops (436) and bottoms (437).

Further, in embodiments the coating stage comprises providing said powder coating (405) on said non-planar substructure (430) with an average thickness (t) of the powder coating (405) relative to the bottoms (437) being equal to or smaller than the maximum substructure height ($t_{sub}$).

The smallest thickness of the coating over a top (rib) may be defined as $t_{low}$. The thickest coating relative to a (deepest) bottom may be defined as $t_{high}$. In embodiments, a ratio ($t_{high}/t_{low}$) is higher than 5.

The herein described method provides 3D printed items. Hence, the invention also provides in a further aspect a 3D printed item obtainable with the herein described method.

The (with the herein described method) obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

Hence, in yet a further aspect the invention provides a 3D printed item comprising 3D printed material comprising a thermoplastic material, the 3D item comprising an item surface which is at least partly provided with a powder coating. As indicated above, the powder coating may especially comprise a thermoset material. Further, in embodiments the 3D printed material may have electrically conductive properties. Therefore, in specific embodiments the 3D printed material has electrically conductive properties, and wherein the powder coating comprises thermoset material.

The item surface (11) of the 3D printed item comprises a non-planar substructure (430) having a maximum substructure height ($t_{sub}$), with superimposed on the non-planar substructure (430) a fused deposition modeling related step structure (435) having tops (436) and bottoms (437), the tops (436) having rib heights ($t_{rib}$) relative to the bottoms (437), selected from the range of 10 μm to 10 mm, said powder coating (405) on said non-planar substructure (430) having a maximum coating thickness ($t_{high}$) relative to a lowest bottom (437) of the non-planar substructure (430), with a ratio of the maximum coating thickness ($t_{high}$) to the rib heights ($t_{rib}$) selected from the range of $1 < t_{high}/t_{rib} \le 1.2$.

The substructure remain visible specially, a ratio ($t_{high}/t_{low}$) is higher than 5 (see also above).

In specific aspects, however, the 3D printed item may be provided as reflector. Therefore, the invention also provides a reflector comprising a reflective surface, especially a specular reflective surface, wherein the reflector comprises the 3D printed item as defined herein, and wherein at least part of the reflective surface is provided by said reflective layer, especially said specular reflective layer. As indicated above, in embodiments the reflective surface comprises one or more of a curved face, a facetted face, and faces configured relative to each under an angle. In embodiments, the reflector is a collimator or a parabolic mirror. Hence, types of reflectors include but are not limited to ellipse shaped reflectors (e.g. for converging rays), parabola shaped reflectors (e.g. for making parallel rays), hyperbola-shaped reflectors (for diverging rays), etc.

The reflector may also be used in a lighting system. Hence, the invention provides in yet a further aspect a lighting system comprising (a) a light source configured to generate light source light and (b) a reflector as defined herein configured to (specularly) reflect at least part of said light source light.

Therefore, in yet a further aspect the invention also provides an optical element comprising an optical element surface, wherein the optical element comprises the 3D printed item obtainable by the method as defined herein or the 3D printed item as defined herein, wherein at least part of the optical element surface is provided by said item surface with said powder coating. The optical element may (thus) be a reflector, a lens, etc.

Further, the invention relates to a software product that can be used to execute the method described herein.

Returning to the 3D printing process, a specific 3D printer may be used to provide the 3D printed item described herein. Therefore, in yet a further aspect the invention also provides a fused deposition modeling 3D printer, comprising (a) a printer head (501) comprising a printer nozzle (502), and (b) a device (575) configured to provide 3D printable material (201) to the printer head (501), wherein the fused deposition modeling 3D printer (500) is configured to provide said 3D printable material (201) to a substrate (1550), and wherein the fused deposition modeling 3D printer (500) further comprises (c) a powder coating applicator (595) configured to apply a powder coating (405) to said substrate (1550).

Especially, the fused deposition modeling 3D printer comprises (a) a printer head comprising a printer nozzle, and (b) a filament providing device configured to provide a filament comprising 3D printable material to the printer head, wherein the fused deposition modeling 3D printer is configured to provide said 3D printable material to a substrate. In specific embodiments, the fused deposition modeling 3D printer further comprises (c) a powder coating applicator configured to apply a powder coating to said substrate. In embodiments, the powder coating applicator may comprise a corona gun, (functionally coupled with the fused deposition modeling 3D printer).

In yet further embodiments, the fused deposition modeling 3D printer comprises (a) a printer head comprising a printer nozzle, and (b) a granulate providing device configured to provide granulate comprising 3D printable material to the printer head, wherein the fused deposition modeling 3D printer is configured to provide said 3D printable material to a substrate (by producing a filament and depositing the filament on the substrate). In specific embodiments, the fused deposition modeling 3D printer further comprises (c) a powder coating applicator configured to apply a powder coating to said substrate. In embodiments, the powder coating applicator may comprise a corona gun, (functionally coupled with the fused deposition modeling 3D printer).

It goes without saying that when desired multiple powder coating layers can also be applied onto the printed surface of the 3D printed item.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
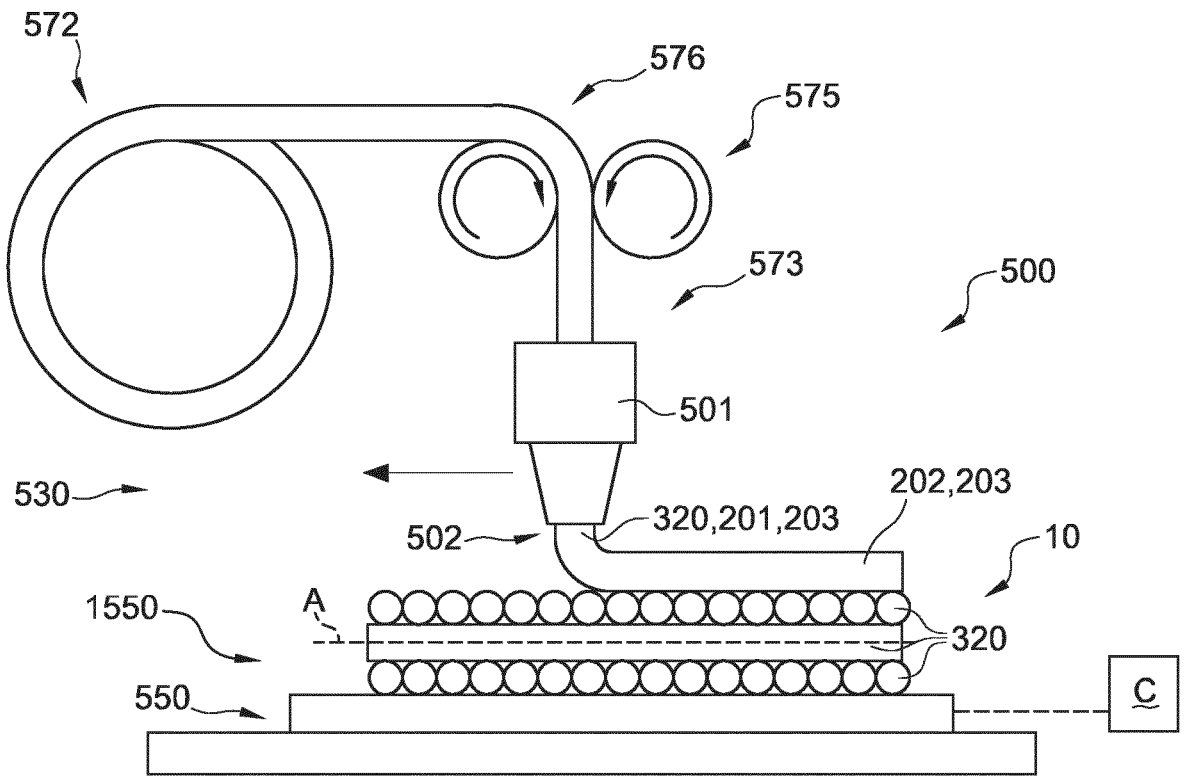
FIGS. 1a-1c schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202. Reference 203 indicates thermoplastic material.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Figure 1B:
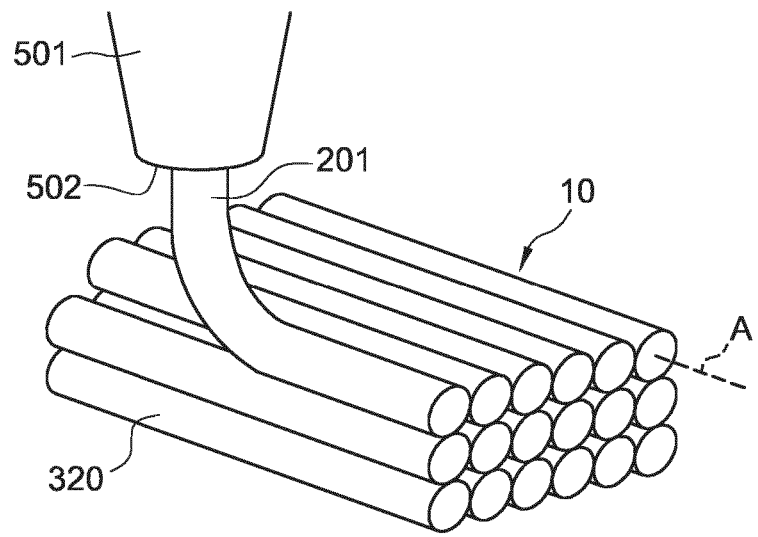

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

The 3D printer may also comprises a robotic "arm" for picking the 3D printed product out of the 3D printer (and putting it on a band or in a box). In yet another embodiment, the suggested 3D printer comprises an inspection/detection means such as a camera.

Figure 1C:
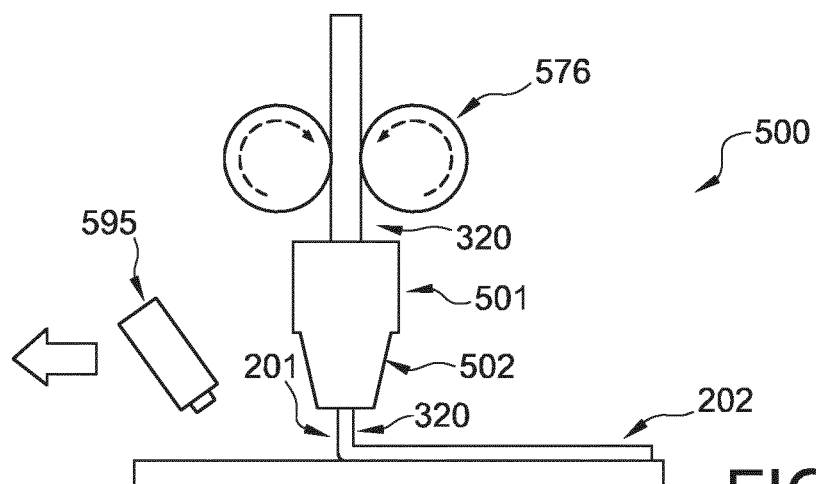

FIG. 1c schematically depicts an embodiment of the fused deposition modeling 3D printer 500, comprising (a) a printer head 501 comprising a printer nozzle 502, and (b) a filament providing device 575 configured to provide a filament 320 comprising 3D printable material 201 to the printer head 501. Especially, the fused deposition modeling 3D printer 500 is configured to provide said 3D printable material 201 to a substrate 1550. Further, the fused deposition modeling 3D printer 500 further comprises (c) a powder coating applicator 595 (such as a corona gun) configured to apply a powder coating 405 to said substrate 1550. The powder application may especially be an electrostatic powder applicator.

FIGS. 1a-1c schematically depict variants where the printable material is provided as filament to the printer head. However, in yet other embodiments the printable material may be provided as granules, with the printer head providing a filament.

Figure 2A:
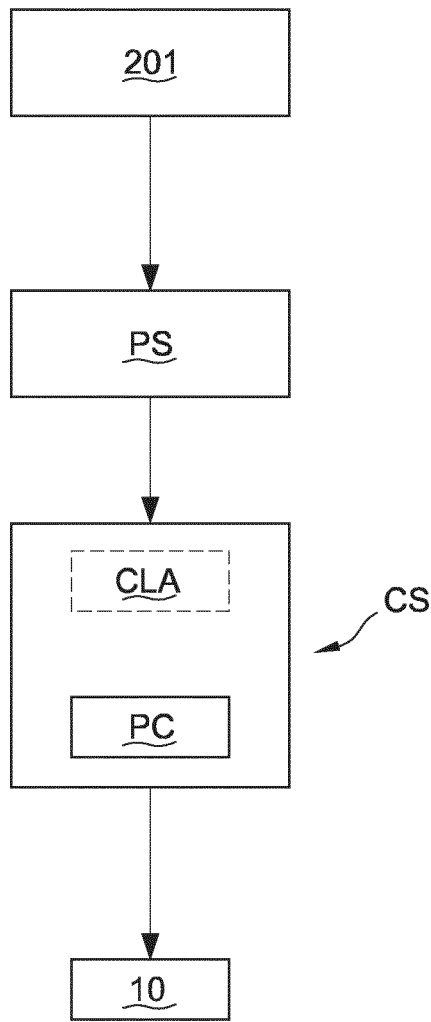
FIGS. 2a-2c schematically depicts some aspects of the printing method and printed items.

FIG. 2a very schematically depicts an embodiment of the method, including a printing stage (PS) and a coating stage (CS), based on providing 3D printable material 201, and providing a 3D printed item 10. The coating stage includes the coating process PC and optionally a conductive layer application process.

Figure 2B:
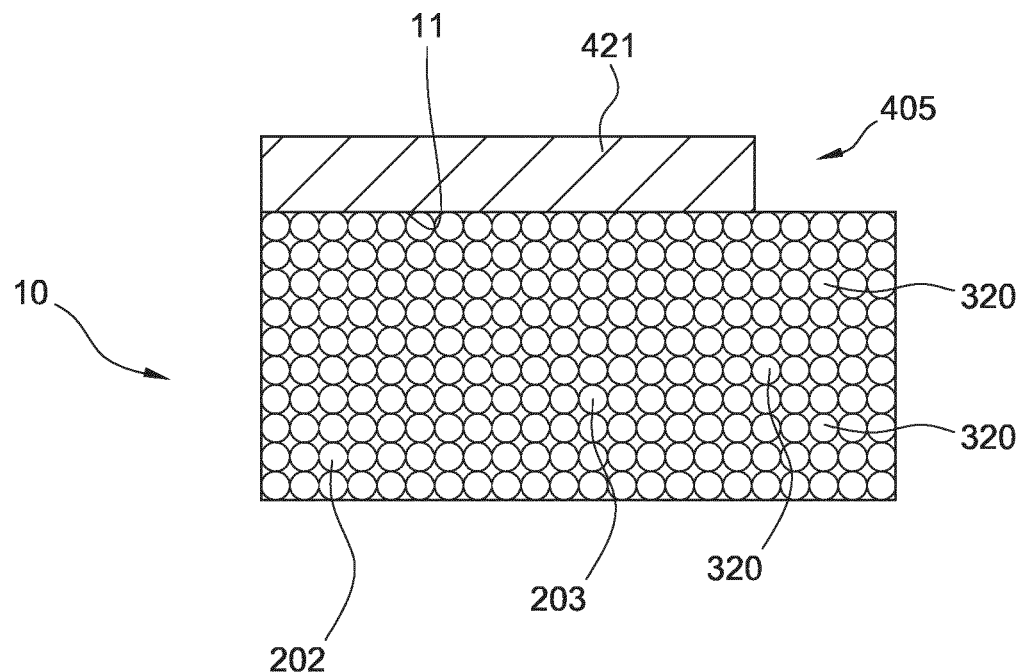

FIG. 2b schematically depicts a 3D item 10. The object shown shows 3D printed material 202, comprises a thermoplastic material 203, with an item surface 11. On at least part thereof, a powder coating 405 is provided. The powder coating 405 comprises coating material 421, especially comprising a thermosetting polymer.

Figure 2C:
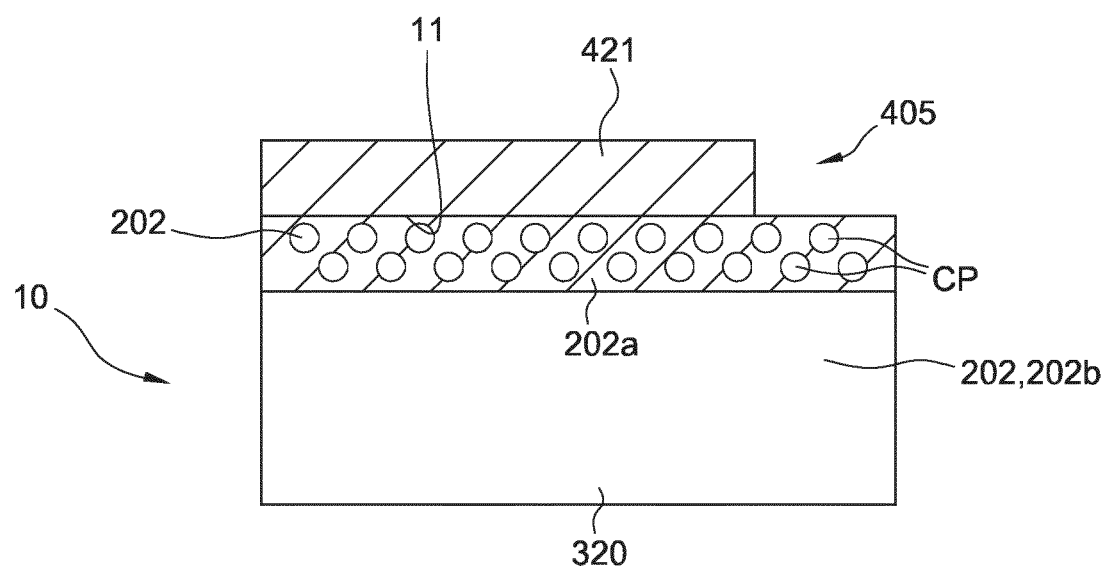

The printable material may comprise carbon particles; hence, the printed material 202 will also comprise such material, thereby providing electrical conductivity. FIG. 2c schematically depicts carbon particles CP.

The method may include providing a first 3D printable material having electrically conductive properties and providing a second 3D printable material has electrically isolating properties, and wherein the printing stage comprises printing said first 3D printable material such that it provides at least part of said item surface 11 of the 3D item 10, and printing said second 3D printable material for those part(s) of the 3D item 10 that are not based on said first 3D printable material. This provides a 3D printed item 10 comprising electrically conductive printed material 202a and electrically insulating printed material 202b, see FIG. 2c.

The surface roughness (bottom to top) for increase with filament thickness.

Figure 3A:
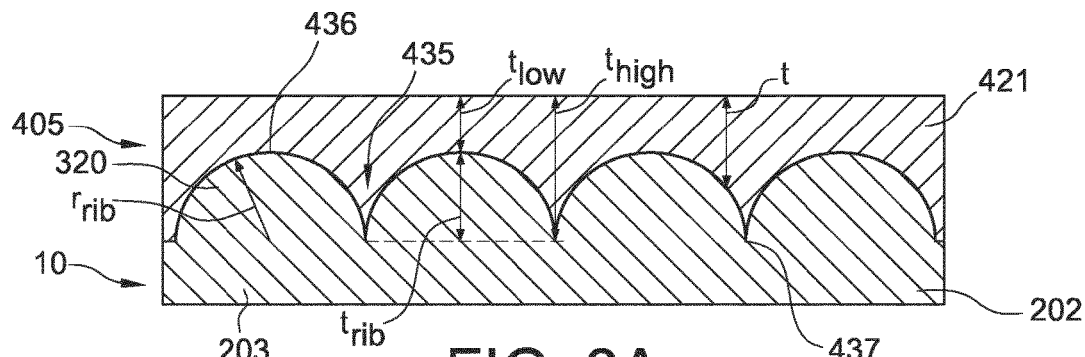
FIGS. 3a-3e schematically depict some embodiments.

In FIG. 3a, very schematically a planarization layer on top of a printed structure. The printed structure shows the characteristic step structure 435 with tops 436 and bottoms 437, defining a height $t_{rib}$. The references $t_{low}$ and $t_{high}$ indicated the layer thickness relative to the top 436 and bottom 437, respectively. The reference $r_{rib}$ indicates a radius from the rib.

Figure 3B:
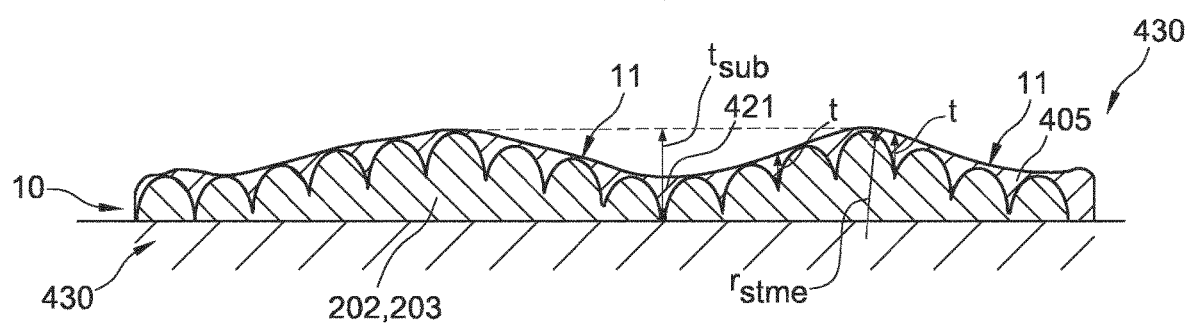
Figure 3C:
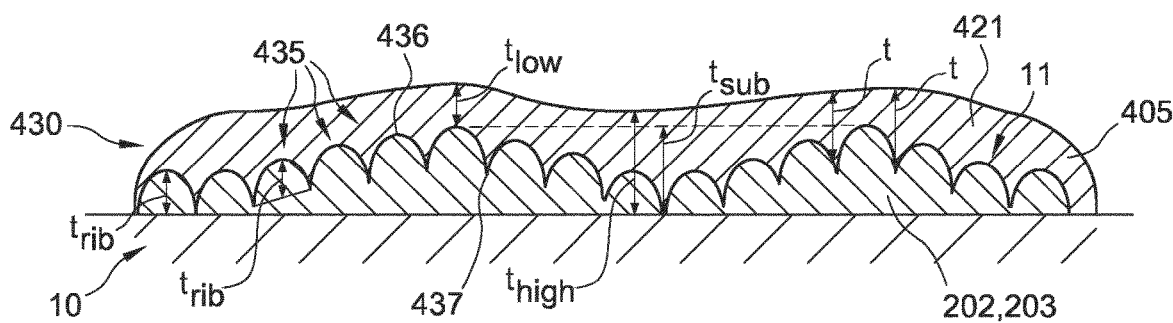

Especially, preferentially the $t_{low}$ is much smaller than $t_{high}$ so that the sub substructures on the surface print can be maintained as shown in FIGS. 3b-3c. Amongst others, it is herein suggested using powder coating with $t_{high}$ is thinner than the smallest sub structure height $t_{sub}$ and especially $t_{high}/t_{low}$ larger than about 5. FIGS. 3b-3c schematically depict embodiments of the 3D item 10 with said item surface 11 comprising a non-planar substructure 430, such as selected from the group of a curved structure 431 and a facet 432, having a maximum substructure height $h_{sub}$, with superimposed on the non-planar substructure 430 a fused deposition modeling related step structure 435 having top-bottom height differences $t_{rib}$ between tops 436 and bottoms 437 (e.g. selected from the range of 10 μm-10 mm). The coating thickness $h_{max}$ relative to the bottoms 437 may be smaller than the maximum substructure height $t_{sub}$. Reference $r_{struc}$ indicates the radius of a curved part of the surface 11

Figure 3D:
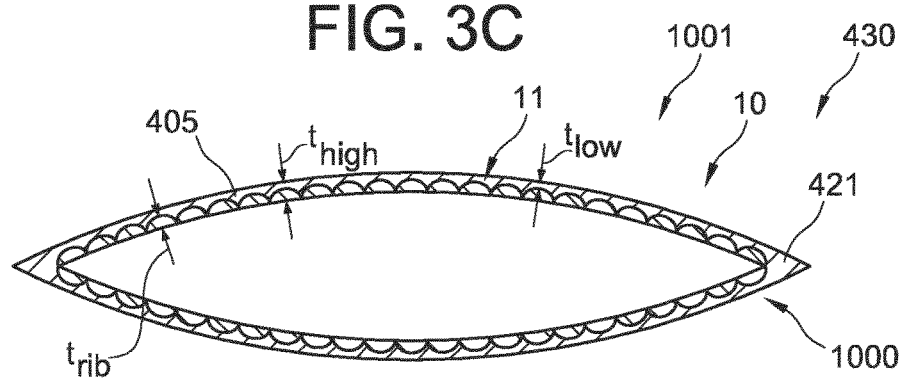

FIG. 3d schematically depicts an embodiment of an optical element 1000 comprising an optical element surface 1001, wherein the optical element comprises the 3D printed item 10 (obtainable by the method as defined herein), wherein at least part of the optical element surface 1001 is provided by said item surface 11 with said powder coating 405. Here, by way of example the element 1000 is a lens, which may except for the coating 405 essentially be 3D printed.

Figure 3E:
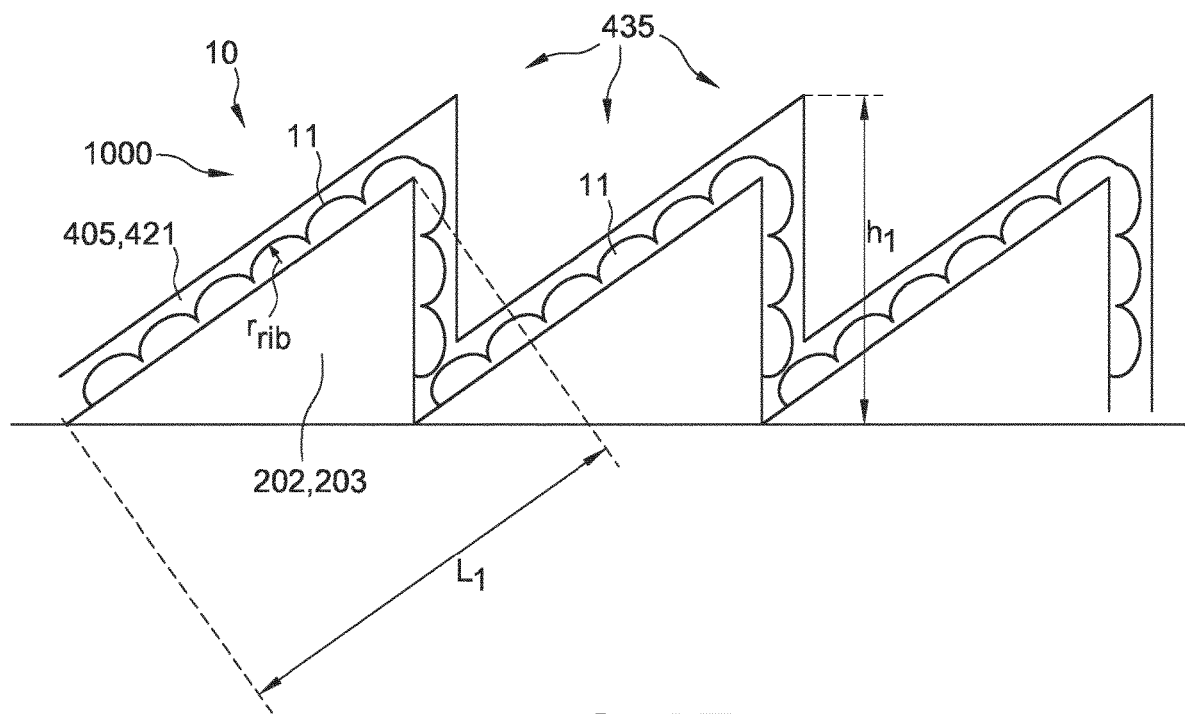

FIG. 3e schematically depicts another 3D printed item, with facets, having e.g. lengths 11 and heights h1, which may be much larger than the radius $r_{rib}$ of the 3D printed material.

EXAMPLES

For powder coating we used prints which were either made using an electrically conductive filament or made using a non-conducting filament which were subsequently provided with an electrically conductive layer. The samples were then coated by a powder obtained from various suppliers using corona discharge method. The powder coated samples were then placed in a preheated oven at a desired temperature for a length of time to obtain a layer of cross-linked polymer. Powders based on epoxy, polyurethane, and polyesters and their mixtures, were used.

Best results were obtained for a very smooth surface when powders were used which could flow well during the melting/reaction. These powders were either pure resin or they contained nano sized pigments such as $TiO_2$ and carbon. These coating showed good filling of ripples ("stair step") and gave glossy smooth surfaces. Coatings which are so called structured coatings did not show high flow and therefore they could not fully cover rippled structure. However, when first coating the printed samples with high-flow powders; curing, and then use structured powder coatings on top in order to cover the underlying rippled structure, also provided the structured finish.

The following materials and conditions were used:
A cylindrical with a ribs $t_{rib}$=100 μm were printed using PC containing conductive carbon. For powder coating we used the following glossy powders Tiger 530, AkzoNobel Interpon 700 Low Bake, Protech HB12-ST. They all could be deposited using corona gun. The samples were then placed in a pre-heated oven at 130° C. for 30 minutes for thermal curing. After curing very smooth surfaces were obtained.

The cylinder was also with the same rib size as above $t_{rib}$=100 μm were produced using a non-conducting PC. A conductive layer was placed onto the printed structure by spraying a thin layer (few micron) of graphite thick in a binder (Graphit 33, Kontakt Chemie). After drying the conductive layer same treatment was used as above for powder coating and curing for obtaining smooth surfaces A cylindrical with a ribes $t_{rib}$=200 μm were printed using PC containing conductive carbon. For powder coating we used glossy powders Protech HB12-ST which was deposited using corona gun. The samples were then placed in a pre-heated oven at 130° C. for 30 minutes for thermal curing. After curing very smooth surfaces were obtained.

A cylindrical with a ribes $t_{rib}$=100 μm were printed using PolySulfon Udel P-1700 (Solvay) containing conductive carbon. Axalta low bake and IGP Durapol 68 series glossy, cured at 150° C. for 20 min, upon curing a smooth layer was obtained.

A conical reflector with a ribes $t_{rib}$=50 μm were printed using PET. PET was then crystallized at 150 C. A conductive layer of carbon was then applied to the surface of the object. Powder from AkzoNobel Interpon Cr ZW007G was deposited using a corona gun and cured at 230° C., for 30 minutes to obtain a smooth surface . . . .

A cylindrical with a ribes $t_{rib}$=200 μm were printed using PC containing conductive carbon. For powder coating we used glossy powders AkzoNobel Interpon 700 Low Bake which was deposited using corona gun. The samples were then placed in a pre-heated oven at 130° C. for 30 minutes for thermal curing. After curing very smooth surfaces were obtained. Subsequently a structured powder from AkzoNobel Interpon 700 Low Bake was used to obtain a structured surface effect.

A cylindrical with a ribes $t_{rib}$=100 μm and a sub structure $t_{sub}$=05 mm was printed using PC containing conductive carbon. For powder coating we used glossy powders AkzoNobel Interpon 700 Low Bake which was deposited using corona gun. The samples were then placed in a pre-heated oven at 130° C. for 30 minutes for thermal curing. After curing very smooth surfaces were obtained where the sub structure.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method for 3D printing a 3D item onto a substrate by means of fused deposition modeling using a 3D printable material that comprises a thermoplastic material, wherein the method comprises:
a preliminary coating process during which a treated substrate is obtained by applying powder to at least part of the substrate;
a printing stage during which the 3D printable material is printed using a fused deposition modeling printer to provide the 3D item onto the treated substrate, wherein the 3D item comprises an item surface, and wherein the method further comprises a coating stage during which a powder coating is provided with a powder coating process on at least part of the item surface; and
wherein the printing stage comprises providing said 3D item with said item surface comprising a non-planar substructure, having a maximum substructure height (tsub), with superimposed on the non-planar substructure a fused deposition modeling related step structure having tops and bottoms, wherein the coating stage comprises providing said powder coating on said non-planar substructure with a powder coating thickness variation relative to the bottoms being equal to or smaller than the maximum substructure height (tsub) to enable the substructure to remain visible.

2. The method according to claim 1, wherein the powder coating process comprises providing a coating material to said item surface, and wherein said coating material comprises a thermosetting polymer.

3. The method according to claim 2, wherein the coating material comprises radiation curable material, and wherein the coating stage comprises providing said coating material to said surface and curing said coating material by providing curing radiation.

4. The method according to claim 2, wherein the coating material comprises a thermally curable material having a curing temperature lower than one or more of a melting temperature and a glass temperature of said thermoplastic material.

5. The method according to claim 1, wherein said 3D printable material has electrically conductive properties, and wherein the printing stage comprises printing said 3D printable material such that it provides at least part of said item surface of the 3D item.

6. The method according to claim 5, wherein the printable material comprises an additive for providing a surface resistivity of equal to or less than $10^9$ ohm/square.

7. The method according to claim 1, wherein the coating stage also includes providing an electrically conductive layer to said item surface before providing said powder coating.

8. The method according to claim 1, wherein a first 3D printable material has electrically conductive properties and wherein a second 3D printable material has electrically isolating properties, and wherein the printing stage comprises printing said first 3D printable material such that it provides at least part of said item surface of the 3D item, and printing said second 3D printable material for those part(s) of the 3D item that are not based on said first 3D printable material.

9. The method according to claim 1, wherein the printing stage comprises providing said 3D item with said item surface comprising a non-planar substructure with superimposed on the non-planar substructure a fused deposition modeling related step structure having tops and bottoms, the tops having rib heights ($t_{rib}$) relative to the bottoms, wherein the coating stage comprises providing said powder coating on said non-planar substructure with a maximum coating thickness ($t_{high}$) relative to a lowest bottom of the non-planar substructure, with a ratio of the maximum coating thickness ($t_{high}$) to the rib heights ($t_{rib}$) selected from the range of $1 < t_{high}/t_{rib} \leq 1.2$.

10. The method of claim 1 wherein the preliminary coating process produces an electrically conductive layer on the treated substrate.

11. The method of claim 1 wherein said applying powder step comprises using a corona gun.

12. The method of claim 1 wherein said non-planar substructure includes one or more curved sections on the surface and the step structure having three or more steps with height differences; and wherein the non-planar substructure has a height difference larger that a height difference between two respective steps.

13. The method according to claim 1, wherein the printing stage comprises providing said 3D item with said item surface comprising a non-planar substructure with superimposed on the non-planar substructure a fused deposition modeling related step structure having tops and bottoms, the tops having rib heights (trib) relative to the bottoms, wherein the coating stage comprises providing said powder coating on said non-planar substructure with a maximum coating thickness (thigh) relative to a lowest bottom of the non-planar substructure, and a minimum coating thickness (tlow) relative to a highest top of the non-planar substructure, with a ratio of the maximum coating thickness (thigh) to the minimum coating thickness (tlow) selected such thigh/tlow is higher than 5 to allow the substructure to remain visible.

14. A method for 3D printing a 3D item onto a substrate by means of fused deposition modeling using a 3D printable material that comprises a thermoplastic material, wherein the method comprises:
  a printing stage during which the 3D printable material is printed using a fused deposition modeling printer to provide the 3D item onto the treated substrate, wherein the 3D item comprises an item surface, and wherein the method further comprises a coating stage during which a powder coating is provided with a powder coating process on at least part of the item surface; and
  wherein the printing stage comprises providing said 3D item with said item surface comprising a plurality of curved sections, wherein the plurality of curved sections, having a maximum curved section height (tsub), with superimposed on the non-planar substructure a fused deposition modeling a step structure having tops and bottoms, wherein the coating stage comprises providing said powder coating on said curved sections with an average thickness (t) of the powder coating relative to the bottoms being equal to or smaller than the maximum curved section height (tsub) to enable the substructure to remain visible.

* * * * *